UNITED STATES PATENT OFFICE.

HENRY A. KOHMAN AND ROY IRVIN, OF PITTSBURGH, PENNSYLVANIA.

MANUFACTURE OF LEAVENED BREAD.

1,345,680.  Specification of Letters Patent.  Patented July 6, 1920.

No Drawing.  Application filed December 13, 1919. Serial No. 344,515.

*To all whom it may concern:*

Be it known that we, HENRY A. KOHMAN and ROY IRVIN, both citizens of the United States, residing in Pittsburgh, Allegheny county, State of Pennsylvania, have invented certain new and useful Improvements in the Manufacture of Leavened Bread, (Case B;) and we do hereby declare the following to be a full, clear, and exact description of the invention, such as will enable others skilled in the art to which it appertains to make and use the same.

The present invention relates to certain new and useful improvements in the manufacture of leavened bread.

The invention is based upon the discovery that the use of lanolin (the refined product obtained from the crude grease or fat known as wool grease), when used as a shortening, in the manufacture of leavened bread, tends to develop the gluten and to give the loaf a better expansion. It is found that when lanolin is used as the shortening agent the resulting loaf of leavened bread is larger in volume than the loaf obtained by the use of any of the usual shortenings, either liquid or of lard-like consistency.

The best refined lanolin is slightly creamy in color and somewhat softer than lard, and is readily incorporated with the other elements of the dough batch through the agency of any efficient mechanical mixer.

The quantity of lanolin employed as the shortening agent, in accordance with our invention, may be from one-fourth to one-fifth less by weight than that of the quantity of lard customarily used and it can be made available at a price less than that of lard. Moreover, it is a superior shortening agent in the manufacture of leavened bread because of its beneficial effect upon the gluten of the flour as hereinbefore referred to and in its property of giving the loaf a superior texture and an increased expansion.

It will, of course, be understood that the dough batch in which the lanolin is to be incorporated, will, in addition to the flour, contain the yeast and other ingredients customary or useful in the manufacture of leavened bread, and that the batch will be fermented and baked in the usual manner.

What we claim is:

In the manufacture of leavened bread, incorporating lanolin in the dough batch as a shortening agent, fermenting, and baking the loaf; substantially as described.

In testimony whereof we hereunto affix our signatures.

HENRY A. KOHMAN.
ROY IRVIN.